US009509217B2

(12) United States Patent
Yan et al.

(10) Patent No.: US 9,509,217 B2
(45) Date of Patent: Nov. 29, 2016

(54) ASYMMETRIC POWER FLOW CONTROLLER FOR A POWER CONVERTER AND METHOD OF OPERATING THE SAME

(71) Applicant: Altera Corporation, San Jose, CA (US)

(72) Inventors: Wenguang Yan, Somerset, NJ (US); Ashraf W. Lotfi, Bridgewater, NJ (US)

(73) Assignee: Altera Corporation, San Jose, CA (US)

(*) Notice: Subject to any disclaimer, the term of this patent is extended or adjusted under 35 U.S.C. 154(b) by 0 days.

(21) Appl. No.: 14/690,921

(22) Filed: Apr. 20, 2015

(65) Prior Publication Data

US 2016/0308440 A1    Oct. 20, 2016

(51) Int. Cl.
*H02M 3/158* (2006.01)

(52) U.S. Cl.
CPC .................. *H02M 3/158* (2013.01)

(58) Field of Classification Search
CPC ................. H02M 3/1584; H02M 2003/1586
USPC .......................................... 323/272, 237.246
See application file for complete search history.

(56) References Cited

U.S. PATENT DOCUMENTS

| | | | |
|---|---|---|---|
| 1,889,398 A | 11/1932 | Bishop | |
| 2,600,473 A | 6/1952 | Brockman | |
| 3,210,707 A | 10/1965 | Constantakes | |
| 3,691,497 A | 9/1972 | Bailey et al. | |
| 3,762,039 A | 10/1973 | Douglass et al. | |
| 3,902,148 A | 8/1975 | Drees et al. | |
| 3,908,264 A | 9/1975 | Friberg et al. | |
| 3,947,699 A | 3/1976 | Whitmer | |
| 4,016,461 A | 4/1977 | Roland | |
| 4,101,389 A | 7/1978 | Uedaira | |
| 4,103,267 A | 7/1978 | Olschewski | |
| 4,187,128 A | 2/1980 | Billings et al. | |
| 4,199,743 A | 4/1980 | Martincic | |
| 4,247,953 A | 1/1981 | Shinagawa et al. | |
| 4,433,927 A | 2/1984 | Cavallari | |
| 4,586,436 A | 5/1986 | Denney et al. | |
| 4,636,752 A | 1/1987 | Saito | |
| 4,654,770 A | 3/1987 | Santurtûn et al. | |
| 4,668,310 A | 5/1987 | Kudo et al. | |

(Continued)

FOREIGN PATENT DOCUMENTS

| | | |
|---|---|---|
| GB | 2041818 A | 9/1980 |
| JP | 1072517 A | 3/1989 |

(Continued)

OTHER PUBLICATIONS

Feng, P., et al., "Chapter 1: History of the High-Voltage Charge Pump," Charge Pump Circuit Design, McGraw-Hill Electronic Engineering, Jun. 27, 2006, pp. 1-10.

(Continued)

*Primary Examiner* — Timothy J Dole
*Assistant Examiner* — Sisay G Tiku
(74) *Attorney, Agent, or Firm* — Fletcher Yoder, P.C.

(57) ABSTRACT

A controller for a power converter formed with a plurality of converter stages, and method of operating the same. In one embodiment, the controller includes a power system controller configured to determine an unequal current allocation among the plurality of converter stages based on an operation of the power converter. The controller also includes a converter stage controller configured to control an output current produced by each of the plurality of converter stages in response to the current allocation.

20 Claims, 6 Drawing Sheets

(56) References Cited

U.S. PATENT DOCUMENTS

| | | |
|---|---|---|
| 4,681,718 A | 7/1987 | Oldham |
| 4,689,735 A | 8/1987 | Young |
| 4,751,199 A | 6/1988 | Phy |
| 4,754,317 A | 6/1988 | Comstock et al. |
| 4,761,725 A | 8/1988 | Henze |
| 4,777,465 A | 10/1988 | Meinel |
| 4,801,816 A | 1/1989 | Merlo et al. |
| 4,808,118 A | 2/1989 | Wilson et al. |
| 4,847,986 A | 7/1989 | Meinel |
| 4,870,224 A | 9/1989 | Smith et al. |
| 4,912,622 A | 3/1990 | Steigerwald et al. |
| 4,916,522 A | 4/1990 | Cohn |
| 4,975,671 A | 12/1990 | Dirks |
| 4,982,353 A | 1/1991 | Jacob et al. |
| 5,056,214 A | 10/1991 | Holt |
| 5,059,278 A | 10/1991 | Cohen et al. |
| 5,096,513 A | 3/1992 | Sawa et al. |
| 5,118,298 A | 6/1992 | Murphy |
| 5,161,098 A | 11/1992 | Balakrishnan |
| 5,187,119 A | 2/1993 | Cech et al. |
| 5,245,228 A | 9/1993 | Harter |
| 5,258,662 A | 11/1993 | Skovmand |
| 5,262,296 A | 11/1993 | Ogawa et al. |
| 5,279,988 A | 1/1994 | Saadat et al. |
| 5,285,369 A | 2/1994 | Balakrishnan |
| 5,345,670 A | 9/1994 | Pitzele |
| 5,353,001 A | 10/1994 | Meinel et al. |
| 5,371,415 A | 12/1994 | Dixon et al. |
| 5,414,341 A | 5/1995 | Brown |
| 5,428,245 A | 6/1995 | Lin et al. |
| 5,436,409 A | 7/1995 | Sawada et al. |
| 5,457,624 A | 10/1995 | Hastings |
| 5,469,334 A | 11/1995 | Balakrishnan |
| 5,481,219 A | 1/1996 | Jacobs et al. |
| 5,484,494 A | 1/1996 | Oda et al. |
| 5,510,739 A | 4/1996 | Caravella et al. |
| 5,524,334 A | 6/1996 | Boesel |
| 5,541,541 A | 7/1996 | Salamina et al. |
| 5,548,206 A | 8/1996 | Soo |
| 5,561,438 A | 10/1996 | Nakazawa et al. |
| 5,568,044 A | 10/1996 | Bittner |
| 5,574,273 A | 11/1996 | Nakazawa et al. |
| 5,574,420 A | 11/1996 | Roy et al. |
| 5,578,261 A | 11/1996 | Manzione et al. |
| 5,592,072 A | 1/1997 | Brown |
| 5,594,324 A | 1/1997 | Canter et al. |
| 5,625,312 A | 4/1997 | Kawakami et al. |
| 5,689,213 A | 11/1997 | Sher |
| 5,692,296 A | 12/1997 | Variot |
| 5,783,025 A | 7/1998 | Hwang et al. |
| 5,787,569 A | 8/1998 | Lotfi et al. |
| 5,788,854 A | 8/1998 | Desaigoudar et al. |
| 5,796,276 A | 8/1998 | Phillips et al. |
| 5,802,702 A | 9/1998 | Fleming et al. |
| 5,807,959 A | 9/1998 | Wu et al. |
| 5,834,691 A | 11/1998 | Aoki |
| 5,835,350 A | 11/1998 | Stevens |
| 5,837,155 A | 11/1998 | Inagaki et al. |
| 5,846,441 A | 12/1998 | Roh |
| 5,864,225 A | 1/1999 | Bryson |
| 5,877,611 A | 3/1999 | Brkovic |
| 5,898,991 A | 5/1999 | Fogel et al. |
| 5,912,589 A | 6/1999 | Khoury et al. |
| 5,920,249 A | 7/1999 | Huss |
| 5,973,923 A | 10/1999 | Jitaru |
| 5,977,811 A | 11/1999 | Maguzzu |
| 5,998,925 A | 12/1999 | Shimizu |
| 6,005,377 A | 12/1999 | Chen et al. |
| 6,060,176 A | 5/2000 | Senkow et al. |
| 6,081,997 A | 7/2000 | Chia et al. |
| 6,094,123 A | 7/2000 | Roy |
| 6,101,218 A | 8/2000 | Nagano |
| 6,118,351 A | 9/2000 | Kossives et al. |
| 6,118,360 A | 9/2000 | Neff |
| 6,160,721 A | 12/2000 | Kossives et al. |
| 6,169,433 B1 | 1/2001 | Farrenkopf |
| 6,201,429 B1 | 3/2001 | Rosenthal |
| 6,211,706 B1 | 4/2001 | Choi et al. |
| 6,222,403 B1 | 4/2001 | Mitsuda |
| 6,239,509 B1 | 5/2001 | Rader, III et al. |
| 6,255,714 B1 | 7/2001 | Kossives et al. |
| 6,262,564 B1 | 7/2001 | Kanamori |
| 6,285,209 B1 | 9/2001 | Sawai |
| 6,285,539 B1 | 9/2001 | Kashimoto et al. |
| 6,288,920 B1 | 9/2001 | Jacobs et al. |
| 6,317,948 B1 | 11/2001 | Kola et al. |
| 6,320,449 B1 | 11/2001 | Capici et al. |
| 6,353,379 B1 | 3/2002 | Busletta |
| 6,366,486 B1 | 4/2002 | Chen et al. |
| 6,388,468 B1 | 5/2002 | Li |
| 6,407,579 B1 | 6/2002 | Goswick |
| 6,407,594 B1 | 6/2002 | Milazzo et al. |
| 6,440,750 B1 | 8/2002 | Feygenson et al. |
| 6,452,368 B1 | 9/2002 | Basso et al. |
| 6,466,454 B1 | 10/2002 | Jitaru |
| 6,477,065 B2 | 11/2002 | Parks |
| 6,479,981 B2 | 11/2002 | Schweitzer, Jr. et al. |
| 6,495,019 B1 | 12/2002 | Filas et al. |
| 6,541,819 B2 | 4/2003 | Lotfi et al. |
| 6,541,948 B2 | 4/2003 | Wong |
| 6,552,629 B2 | 4/2003 | Dixon et al. |
| 6,570,413 B1 | 5/2003 | Kumagai et al. |
| 6,573,694 B2 | 6/2003 | Pulkin et al. |
| 6,578,253 B1 | 6/2003 | Herbert |
| 6,580,258 B2 | 6/2003 | Wilcox et al. |
| 6,608,332 B2 | 8/2003 | Shimizu et al. |
| 6,621,256 B2 | 9/2003 | Muratov et al. |
| 6,624,498 B2 | 9/2003 | Filas et al. |
| 6,639,427 B2 | 10/2003 | Dray et al. |
| 6,649,422 B2 | 11/2003 | Kossives et al. |
| 6,650,169 B2 | 11/2003 | Faye et al. |
| 6,661,216 B1 | 12/2003 | Grant et al. |
| 6,691,398 B2 | 2/2004 | Gutierrez |
| 6,693,805 B1 | 2/2004 | Steigerwald et al. |
| 6,731,002 B2 | 5/2004 | Choi |
| 6,747,538 B2 | 6/2004 | Kuwata et al. |
| 6,759,836 B1 | 7/2004 | Black, Jr. |
| 6,790,379 B2 | 9/2004 | Aoki et al. |
| 6,791,305 B2 | 9/2004 | Imai et al. |
| 6,806,807 B2 | 10/2004 | Cayne et al. |
| 6,808,807 B2 | 10/2004 | Anand et al. |
| 6,815,936 B2 | 11/2004 | Wiktor et al. |
| 6,822,882 B1 | 11/2004 | Jacobs et al. |
| 6,828,825 B2 | 12/2004 | Johnson et al. |
| 6,856,007 B2 | 2/2005 | Warner |
| 6,879,137 B2 | 4/2005 | Sase et al. |
| 6,912,781 B2 | 7/2005 | Morrison et al. |
| 6,922,041 B2 | 7/2005 | Goder et al. |
| 6,922,044 B2 | 7/2005 | Walters et al. |
| 6,922,130 B2 | 7/2005 | Okamoto |
| 6,984,968 B2 | 1/2006 | Moon |
| 6,989,121 B2 | 1/2006 | Thummel |
| 6,998,952 B2 | 2/2006 | Zhou et al. |
| 7,015,544 B2 | 3/2006 | Lotfi et al. |
| 7,019,505 B2 | 3/2006 | Dwarakanath et al. |
| 7,020,295 B2 | 3/2006 | Hamada et al. |
| 7,021,518 B2 | 4/2006 | Kossives et al. |
| 7,023,315 B2 | 4/2006 | Yeo et al. |
| 7,038,438 B2 | 5/2006 | Dwarakanath et al. |
| 7,038,514 B2 | 5/2006 | Leith et al. |
| 7,057,486 B2 | 6/2006 | Kiko |
| 7,061,217 B2 | 6/2006 | Bayer et al. |
| 7,101,737 B2 | 9/2006 | Cobbley |
| 7,102,419 B2 | 9/2006 | Lou et al. |
| 7,109,688 B1 | 9/2006 | Chiu et al. |
| 7,148,670 B2 | 12/2006 | Inn et al. |
| 7,157,888 B2 | 1/2007 | Chen et al. |
| 7,175,718 B2 | 2/2007 | Nobutoki et al. |
| 7,180,395 B2 | 2/2007 | Lotfi et al. |
| 7,190,150 B2 | 3/2007 | Chen et al. |
| 7,214,985 B2 | 5/2007 | Lotfi et al. |
| 7,229,886 B2 | 6/2007 | Lotfi et al. |
| 7,230,302 B2 | 6/2007 | Lotfi et al. |
| 7,230,316 B2 | 6/2007 | Yamazaki et al. |

(56) References Cited

U.S. PATENT DOCUMENTS

| | | |
|---|---|---|
| 7,232,733 B2 | 6/2007 | Lotfi et al. |
| 7,235,955 B2 | 6/2007 | Solie et al. |
| 7,236,086 B1 | 6/2007 | Vinciarelli et al. |
| 7,244,994 B2 | 7/2007 | Lotfi et al. |
| 7,250,842 B1 | 7/2007 | Johnson et al. |
| 7,256,674 B2 | 8/2007 | Lotfi et al. |
| 7,276,998 B2 | 10/2007 | Lotfi et al. |
| 7,297,631 B2 | 11/2007 | Nair et al. |
| 7,319,311 B2 | 1/2008 | Nishida |
| 7,330,017 B2 | 2/2008 | Dwarakanath et al. |
| 7,348,829 B2 | 3/2008 | Choy et al. |
| 7,352,162 B1 | 4/2008 | Chang et al. |
| 7,368,897 B2 | 5/2008 | Qahouq et al. |
| 7,414,507 B2 | 8/2008 | Giandalia et al. |
| 7,423,508 B2 | 9/2008 | Gardner et al. |
| 7,426,780 B2 | 9/2008 | Lotfi et al. |
| 7,434,306 B2 | 10/2008 | Gardner |
| 7,462,317 B2 | 12/2008 | Lotfi et al. |
| 7,482,795 B2 | 1/2009 | Parto et al. |
| 7,482,796 B2 | 1/2009 | Nishida |
| 7,498,522 B2 | 3/2009 | Itoh |
| 7,501,805 B2 | 3/2009 | Chen et al. |
| 7,521,907 B2 | 4/2009 | Cervera et al. |
| 7,522,432 B2 | 4/2009 | Shimizu |
| 7,544,995 B2 | 6/2009 | Lotfi et al. |
| 7,598,606 B2 | 10/2009 | Chow et al. |
| 7,602,167 B2 | 10/2009 | Trafton et al. |
| 7,610,022 B1 | 10/2009 | Teo et al. |
| 7,612,603 B1 | 11/2009 | Petricek et al. |
| 7,635,910 B2 | 12/2009 | Sinaga et al. |
| 7,642,762 B2 | 1/2010 | Xie et al. |
| 7,676,402 B2 | 3/2010 | Moody |
| 7,679,342 B2 | 3/2010 | Lopata et al. |
| 7,688,172 B2 | 3/2010 | Lotfi et al. |
| 7,696,734 B2 * | 4/2010 | Endo ................ H02M 3/1584 323/272 |
| 7,710,093 B2 | 5/2010 | Dwarakanath et al. |
| 7,714,558 B2 | 5/2010 | Wu |
| 7,728,573 B2 | 6/2010 | Capilla et al. |
| 7,733,072 B2 | 6/2010 | Kanakubo |
| 7,746,041 B2 | 6/2010 | Xu et al. |
| 7,746,042 B2 | 6/2010 | Williams et al. |
| 7,790,500 B2 | 9/2010 | Ramos et al. |
| 7,791,324 B2 | 9/2010 | Mehas et al. |
| 7,791,440 B2 | 9/2010 | Ramadan et al. |
| 7,838,395 B2 | 11/2010 | Badakere et al. |
| 7,859,233 B1 | 12/2010 | Silva et al. |
| 7,876,080 B2 | 1/2011 | Dwarakanath et al. |
| 7,876,572 B2 | 1/2011 | Sota et al. |
| 7,888,926 B2 | 2/2011 | Ishino |
| 7,893,676 B2 | 2/2011 | Hanna |
| 7,911,294 B2 | 3/2011 | Harada et al. |
| 7,914,808 B2 | 3/2011 | Malaviya et al. |
| 7,923,977 B2 * | 4/2011 | Huang ............... H02M 3/1584 323/271 |
| 7,936,160 B1 | 5/2011 | Sheehan |
| 7,948,280 B2 | 5/2011 | Dwarakanath et al. |
| 7,948,772 B2 | 5/2011 | Tung et al. |
| 7,974,103 B2 | 7/2011 | Lim et al. |
| 8,013,580 B2 | 9/2011 | Cervera et al. |
| 8,018,315 B2 | 9/2011 | Lotfi et al. |
| 8,030,908 B2 * | 10/2011 | Huang ............... H02M 3/1584 323/237 |
| 8,085,106 B2 | 12/2011 | Huda et al. |
| 8,109,587 B2 | 2/2012 | Ishizaki |
| 8,154,261 B2 | 4/2012 | Lopata et al. |
| 8,283,901 B2 | 10/2012 | Lopata et al. |
| 8,410,769 B2 | 4/2013 | Lopata et al. |
| 8,520,402 B1 | 8/2013 | Sivasubramaniam |
| 8,686,698 B2 | 4/2014 | Lopata et al. |
| 8,692,532 B2 | 4/2014 | Lopata et al. |
| 8,698,463 B2 | 4/2014 | Dwarakanath et al. |
| 8,867,295 B2 | 10/2014 | Lopata et al. |
| 2001/0030595 A1 | 10/2001 | Hamatani et al. |
| 2001/0033015 A1 | 10/2001 | Corisis |
| 2001/0041384 A1 | 11/2001 | Ohgiyama et al. |
| 2002/0008566 A1 | 1/2002 | Taito et al. |
| 2002/0024873 A1 | 2/2002 | Tomishima et al. |
| 2002/0031032 A1 | 3/2002 | Ooishi |
| 2002/0076851 A1 | 6/2002 | Eden et al. |
| 2002/0135338 A1 | 9/2002 | Hobrecht et al. |
| 2002/0153258 A1 | 10/2002 | Filas et al. |
| 2002/0175661 A1 | 11/2002 | Wheeler et al. |
| 2003/0062541 A1 | 4/2003 | Warner |
| 2003/0076662 A1 | 4/2003 | Miehling |
| 2003/0189869 A1 | 10/2003 | Yamagata et al. |
| 2003/0232196 A1 | 12/2003 | Anand et al. |
| 2004/0125621 A1 | 7/2004 | Yang et al. |
| 2004/0130428 A1 | 7/2004 | Mignano et al. |
| 2004/0150500 A1 | 8/2004 | Kiko |
| 2004/0169498 A1 | 9/2004 | Goder et al. |
| 2004/0246077 A1 | 12/2004 | Misu et al. |
| 2004/0268161 A1 | 12/2004 | Ross |
| 2005/0011672 A1 | 1/2005 | Alawani et al. |
| 2005/0035747 A1 | 2/2005 | Mullett |
| 2005/0046405 A1 | 3/2005 | Trafton et al. |
| 2005/0088216 A1 | 4/2005 | Arndt et al. |
| 2005/0167756 A1 | 8/2005 | Lotfi et al. |
| 2005/0168203 A1 | 8/2005 | Dwarakanath et al. |
| 2005/0168205 A1 | 8/2005 | Dwarakanath et al. |
| 2005/0169024 A1 | 8/2005 | Dwarakanath et al. |
| 2005/0179472 A1 | 8/2005 | Nakamura et al. |
| 2005/0212132 A1 | 9/2005 | Hsuan et al. |
| 2006/0009023 A1 | 1/2006 | Nair et al. |
| 2006/0038225 A1 | 2/2006 | Lotfi et al. |
| 2006/0096087 A1 | 5/2006 | Lotfi et al. |
| 2006/0096088 A1 | 5/2006 | Lotfi et al. |
| 2006/0097831 A1 | 5/2006 | Lotfi et al. |
| 2006/0097832 A1 | 5/2006 | Lotfi et al. |
| 2006/0097833 A1 | 5/2006 | Lotfi et al. |
| 2006/0109072 A1 | 5/2006 | Giandalia et al. |
| 2006/0132217 A1 | 6/2006 | Lou et al. |
| 2006/0145800 A1 | 7/2006 | Dadafshar et al. |
| 2006/0197207 A1 | 9/2006 | Chow et al. |
| 2006/0239046 A1 * | 10/2006 | Zane ................ H02M 3/1584 363/65 |
| 2006/0294437 A1 | 12/2006 | Washburn et al. |
| 2007/0013356 A1 * | 1/2007 | Qiu ................ H02M 3/1584 323/288 |
| 2007/0023892 A1 | 2/2007 | Gauche et al. |
| 2007/0025092 A1 | 2/2007 | Lee et al. |
| 2007/0074386 A1 | 4/2007 | Lotfi et al. |
| 2007/0075815 A1 | 4/2007 | Lotfi et al. |
| 2007/0075816 A1 | 4/2007 | Lotfi et al. |
| 2007/0075817 A1 | 4/2007 | Lotfi et al. |
| 2007/0109700 A1 | 5/2007 | Shimogawa et al. |
| 2007/0109825 A1 * | 5/2007 | Qiu ................ H02M 3/156 363/41 |
| 2007/0164721 A1 | 7/2007 | Han |
| 2007/0210777 A1 | 9/2007 | Cervera et al. |
| 2007/0246808 A1 | 10/2007 | Ewe et al. |
| 2007/0296383 A1 | 12/2007 | Xu et al. |
| 2008/0010075 A1 | 1/2008 | Moody |
| 2008/0018366 A1 | 1/2008 | Hanna |
| 2008/0055944 A1 | 3/2008 | Wang et al. |
| 2008/0079405 A1 | 4/2008 | Shimizu |
| 2008/0090079 A1 | 4/2008 | Fajardo et al. |
| 2008/0094114 A1 | 4/2008 | Dwarakanath et al. |
| 2008/0106246 A1 | 5/2008 | Dwarakanath et al. |
| 2008/0180075 A1 | 7/2008 | Xie et al. |
| 2008/0258274 A1 | 10/2008 | Sinaga et al. |
| 2008/0258278 A1 | 10/2008 | Ramos et al. |
| 2008/0301929 A1 | 12/2008 | Lotfi et al. |
| 2009/0004774 A1 | 1/2009 | Lee et al. |
| 2009/0057822 A1 | 3/2009 | Wen et al. |
| 2009/0065964 A1 | 3/2009 | Lotfi et al. |
| 2009/0066300 A1 | 3/2009 | Lotfi et al. |
| 2009/0066467 A1 | 3/2009 | Lotfi et al. |
| 2009/0066468 A1 | 3/2009 | Lotfi et al. |
| 2009/0068347 A1 | 3/2009 | Lotfi et al. |
| 2009/0068400 A1 | 3/2009 | Lotfi et al. |
| 2009/0068761 A1 | 3/2009 | Lotfi et al. |
| 2009/0146297 A1 | 6/2009 | Badakere et al. |
| 2009/0167267 A1 | 7/2009 | Dwarakanath et al. |

(56) References Cited

U.S. PATENT DOCUMENTS

| | | | |
|---|---|---|---|
| 2009/0212751 | A1 | 8/2009 | Cervera et al. |
| 2009/0224823 | A1 | 9/2009 | Gyohten et al. |
| 2009/0261791 | A1 | 10/2009 | Lopata et al. |
| 2009/0295503 | A1 | 12/2009 | Harada et al. |
| 2009/0296310 | A1 | 12/2009 | Chikara |
| 2010/0072816 | A1 | 3/2010 | Kenkare et al. |
| 2010/0084750 | A1 | 4/2010 | Lotfi et al. |
| 2010/0087036 | A1 | 4/2010 | Lotfi et al. |
| 2010/0110794 | A1 | 5/2010 | Kim et al. |
| 2010/0111179 | A1* | 5/2010 | Chujoh ............ H04N 19/00587 375/240.12 |
| 2010/0164449 | A1 | 7/2010 | Dwarakanath et al. |
| 2010/0164650 | A1 | 7/2010 | Abou-Alfotouh et al. |
| 2010/0212150 | A1 | 8/2010 | Lotfi et al. |
| 2010/0214746 | A1 | 8/2010 | Lotfi et al. |
| 2010/0301496 | A1 | 12/2010 | Koduri |
| 2011/0031947 | A1 | 2/2011 | You |
| 2011/0095742 | A1 | 4/2011 | Lopata et al. |
| 2011/0101933 | A1 | 5/2011 | Lopata et al. |
| 2011/0101934 | A1 | 5/2011 | Lopata et al. |
| 2011/0101948 | A1 | 5/2011 | Lopata et al. |
| 2011/0101949 | A1 | 5/2011 | Lopata et al. |
| 2011/0181383 | A1 | 7/2011 | Lotfi et al. |
| 2011/0316501 | A1 | 12/2011 | Cervera et al. |
| 2012/0153912 | A1 | 6/2012 | Demski et al. |
| 2012/0154013 | A1 | 6/2012 | Mera et al. |
| 2012/0176105 | A1* | 7/2012 | Chang ................ H02M 3/1584 323/237 |
| 2013/0293203 | A1* | 11/2013 | Chen .................... H02M 1/084 323/234 |
| 2013/0320951 | A1* | 12/2013 | Wu .................... H02M 3/1584 323/311 |
| 2014/0369147 | A1 | 12/2014 | Mera et al. |

FOREIGN PATENT DOCUMENTS

| | | |
|---|---|---|
| JP | 2-228013 A | 9/1990 |
| JP | 5-314885 | 11/1993 |
| JP | 6-251958 A | 9/1994 |

OTHER PUBLICATIONS

Han, J., "A New Approach to Reducing Output Ripple in Switched-Capacitor-Based Step-Down DC-DC Converters," IEEE Transactions on Power Electronics, vol. 21, No. 6, Nov. 2006, pp. 1548-1555.

"Holtek: HT7660: CMOS Switched-Capacitor Voltage Converter," Nov. 30, 1999, Holtek Semiconductor, Inc., Hsinchu, Taiwan, R.O.C., 9 pages.

"Linear Technology: LT1054: Switched-Capacitor Voltage Converter with Regulator," 1987, Linear Technology Corporation, Milpitas, CA, 16 pages.

"Linear Technology; LTC1144: Switched-Capacitor Wide Input Range Voltage Converter with Shutdown," 1994, Linear Technology Corporation, Milpitas, CA, 8 pages.

MA, M., "Design of High Efficiency Step-Down Switched Capacitor DC-DC Converter," Thesis submitted to Oregon State University, May 21, 2003, pp. 1-65.

"Maxim: MAX828/MAX829 Switched-Capacitor Voltage Inverters," 19-0495; Rev 3; 9/99, Maxim Integrated Products, Sunnyvale, CA, 8 pages.

"National Semiconductor: LM2665: Switched Capacitor Voltage Converter," Sep. 2005, National Semiconductor, Santa Clara, CA, 9 pages.

Chhawchharia, P., et al., "On the Reduction of Component Count in Switched Capacitor DC/DC Convertors," IEEE, Jun. 1997, pp. 1395-1401.

"Automotive Grade AUIRS2016S (TR) High Side Driver with Internal Vs Recharge," International Rectifier, Datasheet, Jan. 26, 2009, 23 pages.

Ludikhuize, A.W., "A Review of RESURF Technology," Proceedings of IEEE ISPSD 2000, May 22, 2000, pp. 11-18.

Crecraft and Gergely, Analog Electronics, Butterworth-Heinemann, First Published 2002, p. 242.

Barrado, A., et al., "New DC/DC, Converter with Low Output Voltage and Fast Transient Response," Proceedings of the IEEE Applied Power Electronics Conference, 2003, pp. 432-437, IEEE, Los Alamitos, CA.

Betancourt-Zamora, R.J. et al., "A 1.5 mW, 200 MHz CMOS VCO for Wireless Biotelemetry," First International Workshop on Design of Mixed-Mode Integrated Circuits and Applications, Jul. 1997, pp. 72-74, Cancun, Mexico.

Goder, D. et al., "V2 Architecture Provides Ultra-Fast Transient Response in Switch Mode Power Supplies," Proceedings of HFPC Power Conversion, 1996, pp. 414-420.

Goodman, J. et al., "An Energy/Security Scalable Encryption Processor Using an Embedded Variable Voltage DC/DC Converter," IEEE Journal of Solid-State Circuits, Nov. 1998, vol. 33, No. 11, IEEE, Los Alamitos, CA.

Horowitz, P., et al., "The Art of Electronics," Second Edition, 1989, pp. 288-291, Cambridge University Press, Cambridge, MA.

"Linear Technology: LTC3736-1: Dual 2-Phase, No RSENSETM, Synchronous Controller with Spread Spectrum," 2004, 28 pp., Linear Technology Corporation, Milpitas, CA.

Lotfi, A.W., et al., "Issues and Advances in High-Frequency Magnetics for Switching Power Supplies," Proceedings of the IEEE, Jun. 2001, vol. 89, No. 6, pp. 833-845, IEEE, Los Alamitos, CA.

Patella, B.J., et al., "High-Frequency Digital Controller IC for DC/DC Converters," IEEE Proceedings of the Applied Power Electronics Conference, Mar. 10, 2002, 7 pp., IEEE, Los Alamitos, CA.

Peterchev, A.V., et al., "Quantization Resolution and Limit Cycling in Digitally Controlled PWM Converters," IEEE Transactions on Power Electronics, Jan. 2003, pp. 301-303, vol. 18, No. 1, IEEE, Los Alamitos, CA.

Redi, R., et al., "Optimizing the Load Transient Response of the Buck Converter," Proceedings of the IEEE Applied Power Electronics Conference, 1998, pp. 170-176, IEEE, Los Alamitos, CA.

Schoneman, G.K., et al., "Output Impedance Considerations for Switching Regulators with Current-Injected Control," Proceedings of the 18th Annual IEEE Power Electronics Specialists Conference, Jun. 1987, pp. 324-355, IEEE, Los Alamitos, CA.

Soto, A., et al. "Analysis of the Buck Converter for Scalling the Supply Voltage of Digital Circuits," Proceedings of the IEEE Applied Power Electronics Conference, 2003, pp. 711-717, IEEE, Los Alamitos, CA.

Soto, A., et al. "Design Methodology for Dynamic Voltage Scaling in the Buck Converter," Proceedings of the IEEE Applied Power Electonics Conference, 2005, pp. 263-269, IEEE, Los Alamitos, CA.

"TPS40100: Midrange Input Synchronous Buck Controller with Adavanced Sequencing and Output Margining" May 2005, 37 pp., Texas Instruments Incorporated, Dallas, TX.

Zhou, X., et al., "Improved Light-Load Efficiency for Synchronous Rectifier Voltage Regulation Module," IEEE Transactions on Power Electronics, Sep. 2000, pp. 826-834, vol. 15, No. 5, IEEE, Los Alimitos, CA.

\* cited by examiner

ASYMMETRIC POWER FLOW CONTROLLER FOR A POWER CONVERTER AND METHOD OF OPERATING THE SAME

TECHNICAL FIELD

The present invention is directed, in general, to electronic devices and, in particular, to a controller for a power converter formed with a plurality of converter stages, and method of operating the same.

BACKGROUND

Modern electronic systems are generally powered from a voltage source that provides a specified load input voltage such as a regulated direct current ("dc") input voltage. The load input voltage is generally provided by a dedicated power converter. An important consideration in the design of such a dedicated power converter is the power conversion efficiency to produce the specified load input voltage from an input power source such as an alternating current ("ac") mains. Power conversion efficiency is understood to be the ratio of an output power to an input power of the power converter.

A conventional power converter can generally be characterized by a nonlinear efficiency function that relates its power conversion efficiency to one or more operating parameters such as input voltage and output current. Further operating parameters such as an operating temperature are also known to affect efficiency, generally to a lesser extent. An efficiency function can be determined from laboratory measurements on a particular power converter design.

Power converters are often designed with a plurality of paralleled power processing stages (referred to as "converter stages" of a multi-stage power converter), each of which produces an equally divided proportionate part of the total output current. The several equally divided proportionate parts of the output current produced by the plurality of converter stages are summed at a circuit node to produce the total output current from the power converter. In conventional practice, the converter stages are jointly regulated to control an output characteristic of the power converter such as an output voltage, and each of the converter stages produces its equal share of the total output current. The result is the efficiency of the power converter is substantially equal to that of the efficiencies of the converter stages, which efficiencies are all substantially equal for their equally divided proportionate part of the total output current.

What is needed in the art is a technique to take advantage of the design of a power converter formed with a plurality of converter stages to produce improved power conversion efficiency. A technique that takes advantage of the plurality converter stages to improve overall power conversion efficiency without adding substantial cost to a power converter would address an industry need in view of current market trends.

SUMMARY OF THE INVENTION

These and other problems are generally solved or circumvented, and technical advantages are generally achieved, by advantageous embodiments of the present invention, which include a controller for a power converter formed with a plurality of converter stages, and method of operating the same. In one embodiment, the controller includes a power system controller configured to determine an unequal current allocation among the plurality of converter stages based on an operation of the power converter. The controller also includes a converter stage controller configured to control an output current produced by each of the plurality of converter stages in response to the current allocation.

The foregoing has outlined rather broadly the features and technical advantages of the present invention in order that the detailed description of the invention that follows may be better understood. Additional features and advantages of the invention will be described hereinafter, which form the subject of the claims of the invention. It should be appreciated by those skilled in the art that the conception and specific embodiment disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, reference is now made to the following descriptions taken in conjunction with the accompanying drawings, in which.

Corresponding numerals and symbols in the different figures generally refer to corresponding parts unless otherwise indicated. The figures are drawn to clearly illustrate the relevant aspects of the preferred embodiments and are not necessarily drawn to scale

DETAILED DESCRIPTION OF ILLUSTRATIVE EMBODIMENTS

The making and using of the presently preferred embodiments are discussed in detail below. It should be appreciated, however, that the embodiments provide many applicable inventive concepts that can be embodied in a wide variety of specific contexts. The specific embodiments discussed are merely illustrative of specific ways to make and use the invention, and do not limit the scope of the invention.

Embodiments will be described in a specific context, namely, a controller for a power converter (also referred to as a "multi-stage power converter") constructed with a plurality of converter stages that controls an output current of the plurality of converter stages to improve overall power conversion efficiency, and methods of operating the same. While the principles of the present invention will be described in the environment of a power converter formed with a plurality of paralleled converter stages, any application or related semiconductor technology such as a power amplifier or motor controller formed with a plurality of power converter stages that may benefit from individual (e.g., but unequal) control of the plurality of power converter stages is well within the broad scope of the present invention.

Figure 1:
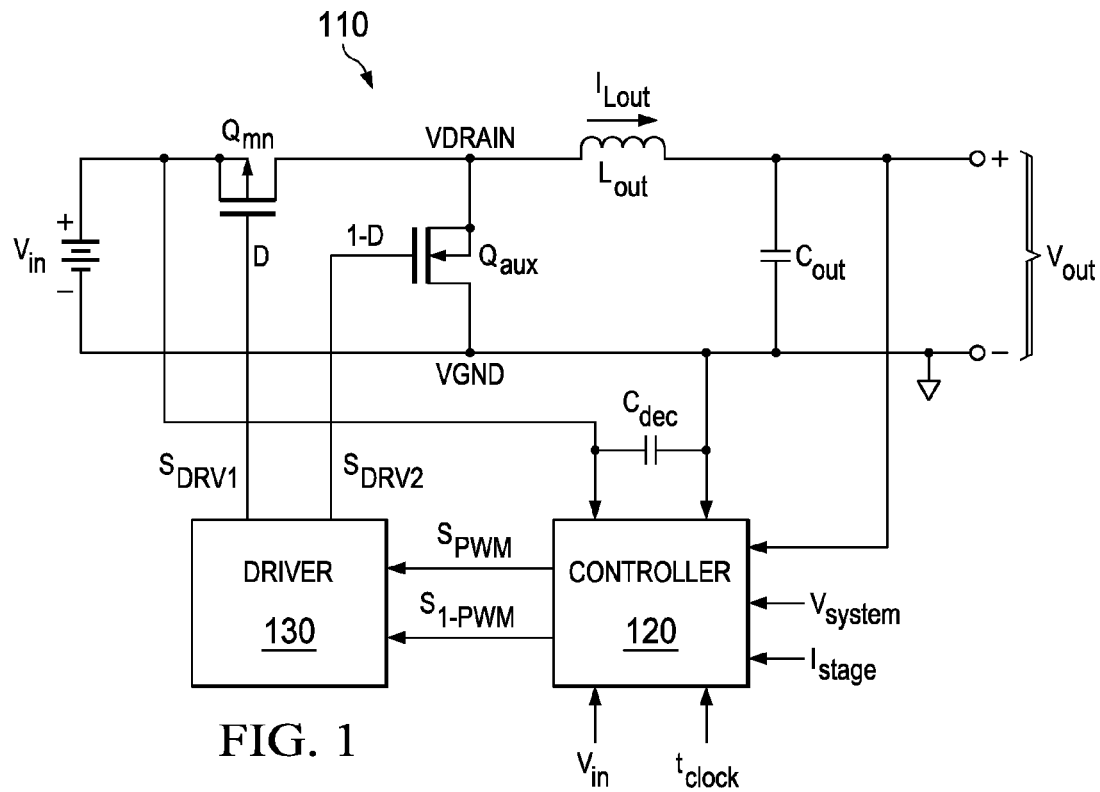
FIG. 1 illustrates a schematic diagram of an embodiment of a power converter including power conversion circuitry.

Referring initially to FIG. 1, illustrated is a schematic diagram of an embodiment of a power converter including power conversion circuitry. While the power converter illustrated in FIG. 1 includes a single converter stage, the power conversion circuitry can be replicated to form a multi-stage power converter. The power converter includes a power train 110, a controller 120 and a driver 130 including control circuit elements, and provides power to a power system such as a microprocessor. While in the illustrated embodiment, the power train 110 employs a buck converter topology, those skilled in the art should understand that other converter topologies such as a forward converter topology are well within the broad scope of the present invention.

The power train 110 receives an input voltage $V_{in}$ from a source of electrical power (represented by a battery) at an input thereof and provides a regulated output voltage $V_{out}$ to power, for instance, a microprocessor at an output thereof. In keeping with the principles of a buck converter topology, the output voltage $V_{out}$ is generally less than the input voltage $V_{in}$ such that a switching operation of the power converter can regulate the output voltage $V_{out}$. An active element such as a power semiconductor switch (e.g., a main power semiconductor switch $Q_{mn}$) is enabled to conduct for a primary interval (generally co-existent with a primary duty cycle "D" of the main power semiconductor switch $Q_{mn}$) and couples the input voltage $V_{in}$ to an output filter inductor $L_{out}$. During the primary interval, an inductor current $I_{Lout}$ flowing through the output filter inductor $L_{out}$ increases as a current flows from the input to the output of the power train 110. A portion of the inductor current $I_{Lout}$ is filtered by the output capacitor $C_{out}$.

During a complementary interval (generally co-existent with a complementary duty cycle "1-D" of the main power semiconductor switch $Q_{mn}$), the main power semiconductor switch $Q_{mn}$ is transitioned to a non-conducting state and another active element such as another power semiconductor switch (e.g., an auxiliary power semiconductor switch $Q_{aux}$), is enabled to conduct. The auxiliary power semiconductor switch $Q_{aux}$ provides a path to maintain a continuity of the inductor current $I_{Lout}$ flowing through the output filter inductor $L_{out}$. During the complementary interval, the inductor current $I_{Lout}$ through the output filter inductor $L_{out}$ decreases. In general, the duty cycle of the main and auxiliary power semiconductor switches $Q_{mn}$, $Q_{aux}$ may be adjusted to maintain a regulation of the output voltage $V_{out}$ of the power converter. Those skilled in the art should understand, however, that the conduction periods for the main and auxiliary power semiconductor switches $Q_{mn}$, $Q_{aux}$ may be separated by a small time interval to avoid cross conduction therebetween and beneficially to reduce the switching losses associated with the power converter. The duty cycle can be controlled with respect to a phase angle of a periodic clock signal $t_{clock}$ produced by an oscillator that may be internal to the controller 120. The designations VDRAIN and VGND illustrated in FIG. 1 identify a drain terminal of the power semiconductor switch $Q_{mn}$ and a ground terminal of the power converter, respectively.

The controller 120 receives the desired characteristic such as a desired 1.2 volt power system bias voltage $V_{system}$ from an internal or external source associated with the microprocessor, and the output voltage $V_{out}$ of the power converter. The controller 120 is also coupled to the input voltage $V_{in}$ of the power converter and a return lead of the source of electrical power (again, represented by a battery) to provide a ground connection therefor. A decoupling capacitor $C_{dec}$ is coupled to the path from the input voltage $V_{in}$ to the controller 120. The decoupling capacitor $C_{dec}$ is configured to absorb high frequency noise signals associated with the source of electrical power to protect the controller 120. Alternatively, the controller 120 may receive an allocated stage current $I_{stage}$ to control an output current of a converter stage of a multi-stage power converter.

In accordance with the aforementioned characteristics, the controller 120 provides a signal (e.g., a pulse width modulated signal $S_{PWM}$) to control a duty cycle and a frequency of the main and auxiliary power semiconductor switches $Q_{mn}$, $Q_{aux}$ of the power train 110 to regulate the output voltage $V_{out}$ or the allocated stage current $I_{stage}$ thereof. The controller 120 may also provide a complement of the signal (e.g., a complementary pulse width modulated signal $S_{1-PWM}$) in accordance with the aforementioned characteristics. Any controller adapted to control at least one power semiconductor switch of the power converter is well within the broad scope of the present invention. As an example, a controller employing digital circuitry is disclosed in U.S. Pat. No. 7,038,438, entitled "Controller for a Power Converter and a Method of Controlling a Switch Thereof," to Dwarakanath, et al. and U.S. Pat. No. 7,019,505, entitled "Digital Controller for a Power Converter Employing Selectable Stages of a Clock Signal," to Dwarakanath, et al., which are incorporated herein by reference.

The power converter also includes the driver 130 configured to provide drive signals $S_{DRV1}$, $S_{DRV2}$ to the main and auxiliary power semiconductor switches $Q_{mn}$, $Q_{aux}$, respectively, based on the signals $S_{PWM}$, $S_{1-PWM}$ provided by the controller 120. There are a number of viable alternatives to implement a driver 130 that include techniques to provide sufficient signal delays to prevent crosscurrents when controlling multiple power semiconductor switches in the power converter. The driver 130 typically includes active elements such as switching circuitry incorporating a plurality of driver switches that cooperate to provide the drive signals $S_{DRV1}$, $S_{DRV2}$ to the main and auxiliary power semiconductor switches $Q_{mn}$, $Q_{aux}$. Of course, any driver 130 capable of providing the drive signals $S_{DRV1}$, $S_{DRV2}$ to control a power semiconductor switch is well within the broad scope of the present invention. As an example, a driver is disclosed in U.S. Pat. No. 7,330,017, entitled "Driver for a Power Converter and Method of Driving a Switch Thereof," to Dwarakanath, et al., which is incorporated herein by reference. Also, an embodiment of a semiconductor device that may embody portions of the power conversion circuitry is disclosed in U.S. Pat. No. 7,230,302, entitled "Laterally Diffused Metal Oxide Semiconductor Device and Method of Forming the Same," to Lotfi, et al., and U.S. patent application Ser. No. 14/091,739, entitled "Semiconductor Device including Alternating Source and Drain Regions, and Respective Source and Drain Metallic Strips," to Lotfi, et al., which are incorporated herein by reference, and an embodiment of an integrated circuit embodying power conversion circuitry, or portions thereof, is disclosed in U.S. Pat. No. 7,015,544, entitled "Integrated Circuit Employable with a Power Converter," to Lotfi, et al., which is incorporated by reference. Also, an embodiment of a packaged integrated circuit embodying a power converter and controller is disclosed in U.S. patent application Ser. No. 14/632,641, entitled "Packaged Integrated Circuit Including a Switch-Mode Regulator and Method of Forming the Same," which is incorporated by reference.

Figure 2:
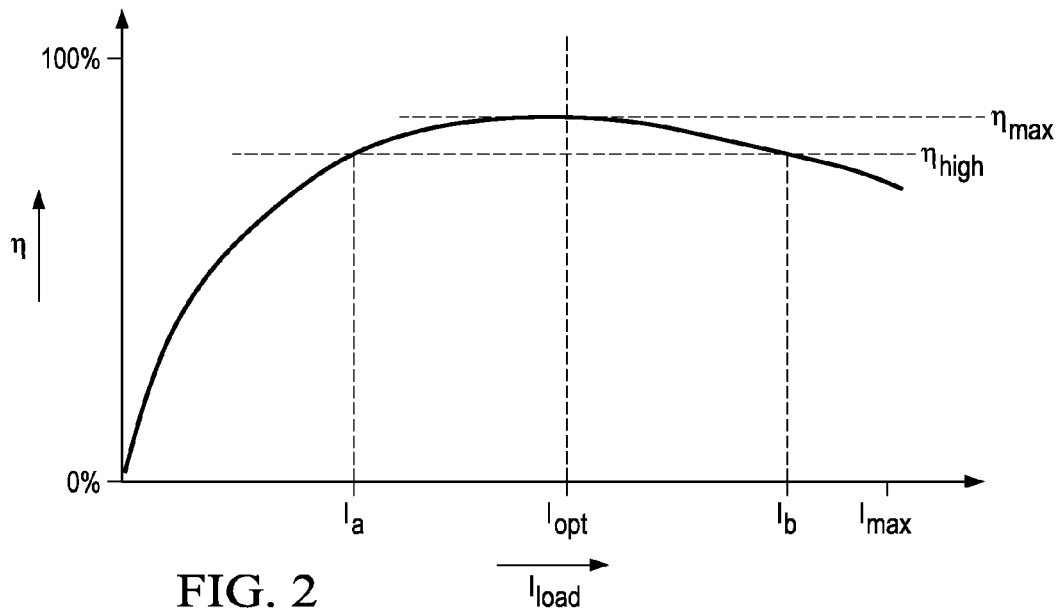
FIG. 2 illustrates a graphical representation demonstrating power converter efficiency of a power converter.

Turning now to FIG. 2, illustrated is a waveform diagram demonstrating power converter efficiency of a power converter. The waveform diagram displays power converter efficiency η verses load current $I_{load}$ of the power converter at a particular input voltage $V_{in}$. As illustrated by the curved line in FIG. 2, a maximum power converter efficiency $η_{max}$ is achieved at an optimum output current level $I_{opt}$ that is generally less than a maximum rated output current $I_{max}$ for the power converter. The designer of a power converter generally takes into account an expected operating current level for a particular application to maximize power converter efficiency η at an expected operating current level and at an expected operating input voltage. However, in many power system applications a power converter operates over a range of input voltages and a range of output currents. Thus, the power converter frequently provides a power conversion efficiency substantially lower than its maximum value.

The power converter efficiency curve illustrated in FIG. 2 shows that a relatively high power converter efficiency $η_{high}$ can be obtained over a limited range of currents extending between the current levels $I_a$, $I_b$, which can reflect either the total output current of the power converter or the individual currents produced by symmetrically sized converter stages (i.e., for converter stages substantially equally constructed).

A controller for a multi-stage power converter may control the current produced by symmetric converter stages in equally allocated portions (i.e., each converter stage is controlled to produce the same contribution to the total output current). In such a case, a multi-stage power converter does not independently regulate power flow in each converter stage. Equal current/power sharing among the converter stages is achieved by using substantially identical components to construct the converter stages.

As introduced herein, a power converter is formed with a plurality of converter stages coupled to common input node and a common output node. A portion of the controller, referred to herein as a power system controller, regulates a characteristic at the output node such as an output voltage. In addition, the power system controller determines and regulates allocation of current produced by the individual converter stages and supplied to the common output node to improve an overall power conversion efficiency of the power converter. In an embodiment, the power system controller allocates and regulates the division of current produced by the individual converter stages with consideration of another power system characteristic such as a level of output ripple voltage, in addition to the overall power conversion efficiency. In an embodiment, a duty-cycle phase angle of each converter stage may be differently controlled to reduce, for example, an output voltage or current ripple.

The converter stage controllers regulate individual output currents of respective converter stages to be equal to an allocation of current determined by the power system controller. In an embodiment, the individual converter stages are symmetrically constructed to exhibit essentially equal power conversion efficiencies at a particular output current level. In an embodiment, the individual converter stages are asymmetrically constructed to exhibit different power conversion efficiencies at a particular output current level.

Thus, control of an output characteristic such as power converter output voltage and the current allocation among a plurality of converter stages are arranged so that an overall improvement in power conversion efficiency is obtained without compromising control of the output characteristic. This power converter control architecture is applicable to both symmetric and asymmetric power converter architectures formed with a plurality of converter stages. It is noted that the power processed by each converter stage is proportional to the current produced by each converter stage because each converter stage produces substantially the same output voltage. The power converter constructed with a plurality of converter stages, particularly asymmetrically constructed converter stages that are asymmetrically controlled, have been found to exhibit an efficiency improvement as high as thirty percent in some environments in comparison to a power converter constructed with symmetric stages that are each identically controlled to contribute the same level of output current.

Figure 3:
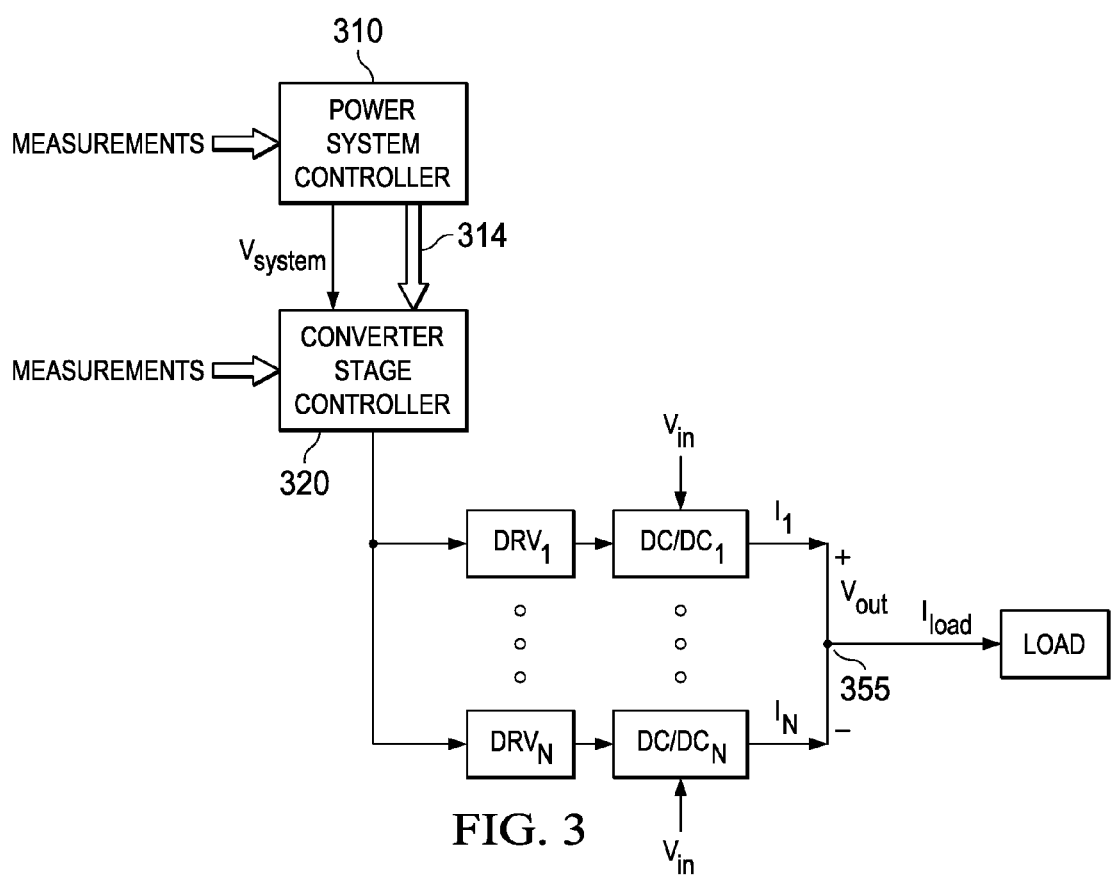
FIGS. 3 and 4 illustrate block diagrams of an embodiment of a power converter.

Turning now to FIG. 3, illustrated is a block diagram of an embodiment of a power converter. The power converter includes a power system controller 310 and a converter stage controller 320 that jointly control a plurality of N (where N>1) converter stages $DC/DC_1$, ..., $DC/DC_N$. The power system controller 310 produces the system output voltage $V_{system}$ coupled to converter stage controller 320. In addition, power system controller 310 produces current allocations 314 for the converter stage controller 320 to control their individual contributions to the load current $I_{load}$ produced by the converter stages $DC/DC_1$, ..., $DC/DC_N$. The power system controller 310 receives power converter measurements such as an input voltage $V_{in}$ and an output voltage $V_{out}$ produced at a circuit node 355. The power system controller 310 is constructed with power converter efficiency curves that represent efficiencies of the individual converter stages as a function of input voltage, output voltage, and individual converter stage output currents. In addition, the power system controller 310 includes an optimization algorithm to reduce an operation/performance/penalty function, such as minimizing or otherwise reducing an overall power loss of the power converter under constraints, such as a maximum output current for a particular converter stage. Minimizing or otherwise reducing an overall power loss is substantially equivalent to maximizing or improving an overall power conversion efficiency. Processes to augment or optimize an operation function are well known in the art and will not be described herein in the interest of brevity.

The converter stage controller 320 also receives measurements such as measurements of the converter stage load currents $I_1$, ..., $I_N$ produced by the converter stages $DC/DC_1$, ..., $DC/DC_N$. Corresponding driver circuits $DRV_1$, ..., $DRV_N$ produce drive signals for power switches (not shown) in the respective converter stages $DC/DC_1$, ..., $DC/DC_N$ to produce an allocated proportion of the load current $I_{load}$ as signaled by the power system controller 310. In an embodiment, one converter stage controls the output voltage $V_{out}$ to be equal to the system voltage $V_{system}$, and the remaining N-1 converter stages control their individual contributions to the load current $I_{load}$.

The efficiency curves employed by the power system controller 310 can be represented, without limitation, by a look-up table or by an analytic function. The optimization algorithm that reduces the penalty function can be constructed, without limitation, with software code or with a state machine. The optimization algorithm can reside in a field-programmable gate array ("FPGA") and/or in a separate dc-dc controller. The control processes for the voltage and current employed by the converter stage controller 320 can be linear or nonlinear, can operate in a voltage mode or a current mode, and can be operated continuously or can operate in discrete time steps. The implementation of the converter stage controller 320 can be constructed with an analog or digital circuit.

In operation, power converter efficiency functions as a function of individual converter stage currents, $\eta_1(I_1)$, $\eta_2(I_2), \ldots, \eta_N(I_N)$, are obtained and stored for each of the N converter stages. An example operation/performance/penalty function J dependent on the individual converter stage currents $I_1, \ldots, I_N$ is represented below by equation (1):

$$J = \frac{I_1}{\eta_1(I_1)} + \frac{I_2}{\eta(I_2)} + \ldots \frac{I_N}{\eta(I_N)}, \quad (1)$$

where the operation/performance/penalty function J is proportional to an equivalent overall power converter input current constructed as a sum of terms formed by dividing individual converter stage currents by their respective power converter efficiencies. Minimizing the function J is substantially equivalent to maximizing overall power converter efficiency. It is contemplated that other penalty functions can be employed in place of that illustrated above by equation (1). A constraint on the individual converter stage currents is that they sum to the load current $I_{load}$ as illustrated below by equation (2):

$$I_{load} = I_1 + I_2 + \ldots + I_N. \quad (2)$$

The optimization algorithm selects the individual allocated converter stage currents such that the operation/performance/penalty function J is minimized or otherwise reduced under the constraint of equation (2). The individual converter stage currents allocated by the power system controller are used by the converter stage controller to control the proportionate share of current produced by the individual controller stages.

Figure 4:
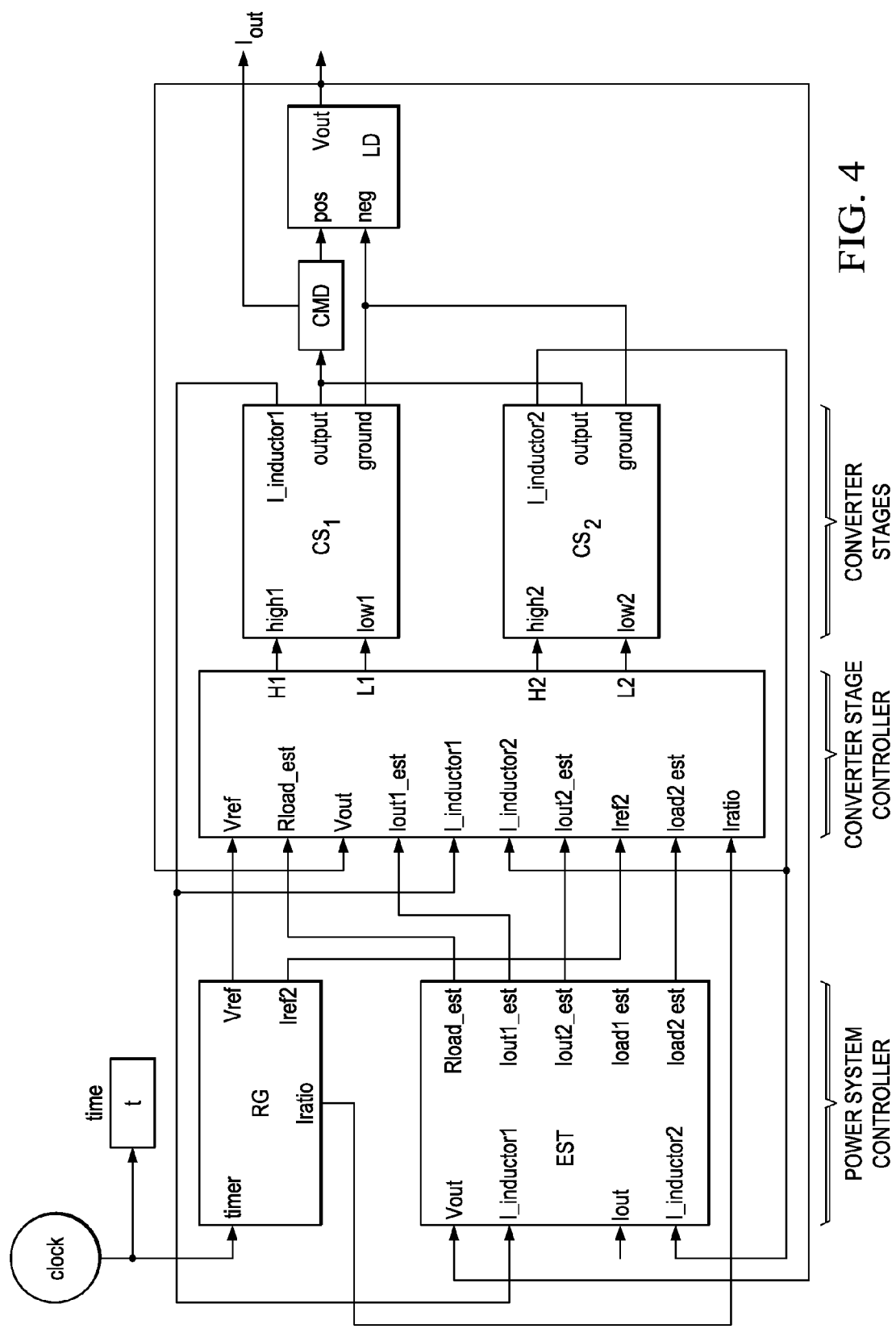

Turning now to FIG. 4, illustrated is a block diagram of an embodiment of a power converter. The power converter includes a power system controller formed with a reference generator RG that produces a system voltage (e.g., a reference voltage Vref) to control an output voltage $V_{out}$ of the power converter. In addition, the power system controller includes an estimator EST that performs a minimization (or reduction) of an operation/performance/penalty function such as the performance/penalty function J described previously above. The power system controller produces desired proportionate current levels $I_{out1\_est}$, $I_{out2\_est}$ for each of the two converter stages $CS_1$, $CS_2$ of the power converter. To perform the necessary control functions, a measurement (via a current measurement device CMD) of a load current (e.g., an output current $I_{out}$) supplied to a load LD as well the output voltage $V_{out}$ are measured and supplied to the power system controller. The power system controller may also measure an input voltage (not shown) to the power converter. The power system controller can also provide a desired current Iref2 for the converter stage $CS_2$, a current ratio Iratio between the two converter stages $CS_1$, $CS_2$ and an estimate of a load load2 est for the converter stage $CS_2$ to the converter stage controller.

The allocated proportionate current levels $I_{out1\_est}$, $I_{out2\_est}$ for the two converter stages $CS_1$, $CS_2$ are coupled to the converter stage controller that produces control signals "high 1" (also designated "H1"), "low 1" (also designated "L1"), "high 2" (also designated "H2"), "low 2" (also designated "L2") for power switches in the converter stages $CS_1$, $CS_2$. These control signals produce proportionate shares of respective converter stage currents that optimize (or other reduce) the performance/penalty function J. The measured inductor currents I_inductor1, I_inductor2 provide an indication of the current levels from the converter stages $CS_1$, $CS_2$, respectively, to the power system controller.

Figure 5:
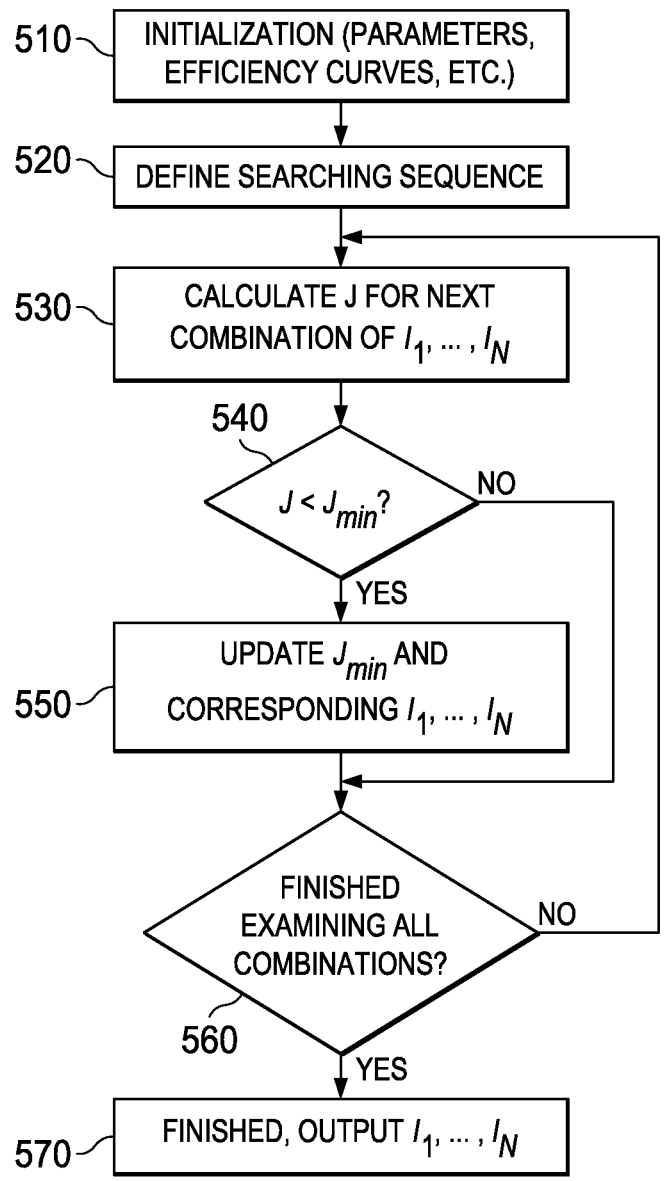
FIG. 5 illustrates a flow diagram of an embodiment of a method of operating a power converter.

Turning now to FIG. 5, illustrated is a flow diagram of an embodiment of a method of operating a power converter. The method describes a process for computing individual converter stage currents that produce a minimum or improved value for the performance/penalty function J. The process begins in a step or module 510 wherein various parameters such as power converter voltages $V_{in}$, $V_{out}$, efficiency curves, etc., to perform the method are initialized. In a step or module 520, a search sequence is defined to find a desired set of values for the individual converter stage currents $I_1, \ldots, I_N$ that reduce or otherwise improve the performance/penalty function J. For example, test values or incremental changes for the individual converter stage currents $I_1, \ldots, I_N$ can be selected, without limitation, by a random search process in an N-dimensional space spanning the N individual converter stage currents. Each converter stage current is constrained to lie in the range $[0, I_{i\_max}]$, where $I_{i\_max}$ is a maximum current rating for the $i^{th}$ converter stage. In another alternative, a small change for a selected individual converter stage current is made one at a time for each converter stage current, and an assessment is made whether the performance/penalty function J is increased or decreased. The direction of change for the individual converter stage current is then determined by the sign of the change of the performance/penalty function J.

In a step or module 530, the performance/penalty function J is calculated for a next combination of the individual converter stage currents $I_1, \ldots, I_N$. In a step or module 540, the value of the performance/penalty function J is compared to a previous value $J_{min}$ computed in a previous step. If the value of the performance/penalty function J is less than the previous value $J_{min}$, then the process continues in a step or module 550 wherein the value $J_{min}$ is updated and the corresponding individual converter stage currents $I_1, \ldots, I_N$ are stored. If the value of the performance/penalty function J is not less than the previous value $J_{min}$, then the method continues in a step or module 560.

Selection of the particular search process to minimize or otherwise improve the performance/penalty function J will generally be dependent on the nature of the function representing power conversion efficiency of the individual controller stages. The presence or absence of discontinuities in the performance/penalty function J can influence selection of the search process. In an embodiment, a combination of search techniques to determine the desired individual converter stage currents $I_1, \ldots, I_N$ can be employed.

In the step or module 560, an assessment is made to determine if a sufficient number of combinations of the individual converter stage currents have been tested. For example, if the computed value of the performance/penalty function J is marginally less than a previous best value, then it can be judged that a sufficient number of combinations of individual converter stage currents have been tested. Another possible termination test is to count the number of combinations of individual converter stage currents that have been tested and terminate the process if the count reaches a predetermined number. A combination of termination criteria can be employed.

If sufficient combinations of individual converter stage currents have not been tested, the method returns to the step or module 530. If sufficient combinations of the individual converter stage currents have been tested, then the optimization process is deemed to have finished and the corresponding individual converter stage currents $I_1, \ldots, I_N$ are output to a converter stage controller (see, e.g., converter stage controller 320 described with respect to FIG. 3) at a step or module 570.

For the converter stage controller, the desired current values for the individual converter stages can be given by the power system controller. In addition, a system voltage $V_{system}$ and output voltage $V_{out}$ are also supplied to the converter stage controller. The converter stage controller can employ one converter stage to control the output voltage $V_{out}$ to be equal to the desired system voltage $V_{system}$. As examples, a proportional-integral-differential controller or a nonlinear controller can be employed for the converter stage controller. The remaining N−1 controller stages are employed to control the individual stage currents $I_2, \ldots, I_N$ to be equal to the values obtained from the power system controller. By Kirchoff's current law, the individual stage current $I_1$ for the first converter stage is determined from equation (2) illustrated hereinabove. The result is the output voltage $V_{out}$ and the currents $I_1, \ldots, I_N$ in each respective converter stage are controlled simultaneously. Several control structures can be employed, without limitation, for an analog or digital voltage-mode control process that can be used in a feedback process for the converter stage controller.

Figure 6:
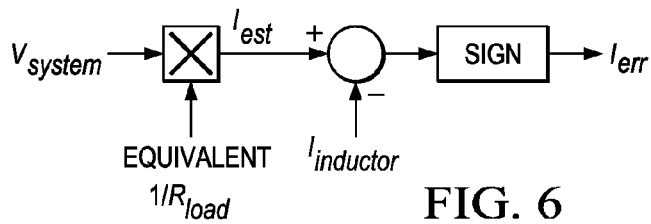
FIGS. 6 to 10 illustrate block diagrams of an embodiment of a portion of a control process employable with a converter stage controller.

Turning now to FIG. 6, illustrated is a block diagram of an embodiment of a portion of a voltage-mode control process employable with a converter stage controller. A system voltage $V_{system}$ and an equivalent reciprocal load resistance $1/R_{load}$ are coupled to a multiplier that produces a current estimate $I_{est}$ to be produced by a converter stage. The current estimate $I_{est}$ and a measured current $I_{inductor}$ in a converter stage from an output filter inductor are subtracted with a sign change to generate an error signal $I_{err}$ that can be used to control the current of the converter stage.

Figure 7:
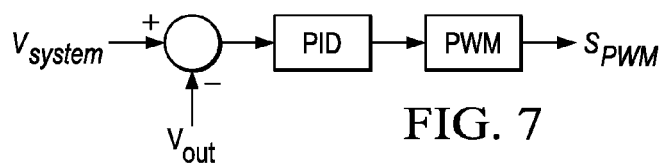

Turning now to FIG. 7, illustrated is a block diagram of an embodiment of a portion of a voltage-mode control process employable with a converter stage controller. A system voltage $V_{system}$ and an output voltage $V_{out}$ produced by the power converter are subtracted, and a voltage difference is coupled to a proportional-integral-differential ("PID") control stage. An output of the PID control stage is fed to a pulse-width modulator ("PWM") that produces a control signal $S_{PWM}$ for a control terminal of a power switch in the controller stage.

Figure 8:
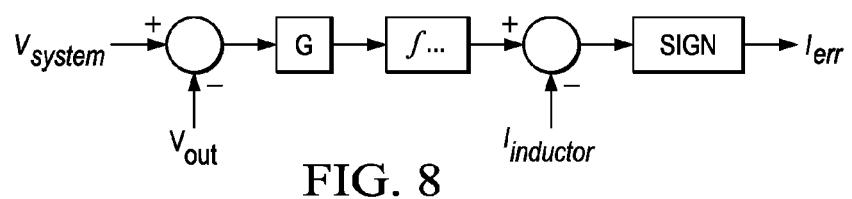

Turning now to FIG. 8, illustrated is a block diagram of an embodiment of a portion of a voltage-mode control process employable with a converter stage controller. A system voltage $V_{system}$ and an output voltage $V_{out}$ produced by the power converter are subtracted, and a voltage difference is presented to a proportional function (G) and integral gain functions. The result produced thereby and a measurement of a measured current $I_{inductor}$ in a converter stage from an output filter inductor are subtracted with a sign change to generate an error signal $I_{err}$ that can be used to control the current of the converter stage. As set forth herein, several control processes can be employed, without limitation, for an analog or digital current-mode control process that can be used in a feedback process for the converter stage controller.

Figure 9:
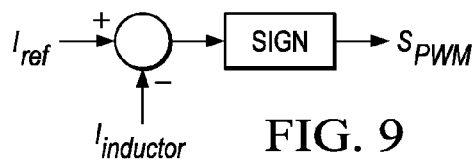

Turning now to FIG. 9, illustrated is a block diagram of an embodiment of a portion of a current-mode control process employable with a converter stage controller. An input reference current $I_{ref}$ and an instantaneous measured current $I_{inductor}$ in a converter stage from an output filter inductor are subtracted with changed sign to produce a control signal $S_{PWM}$ for a control terminal of a power switch in the controller stage.

Figure 10:
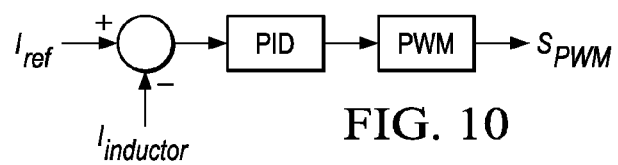

Turning now to FIG. 10, illustrated is a block diagram of an embodiment of a portion of a current-mode control process employable with a converter stage controller. An input reference current $I_{ref}$ and an instantaneous measured current $I_{inductor}$ in a converter stage from an output filter inductor are subtracted and the difference is presented to a PID control stage. The output of the PID control stage is coupled to a pulse-width modulator that produces a control signal $S_{PWM}$ for a control terminal of a power switch in the controller stage.

Figure 11:
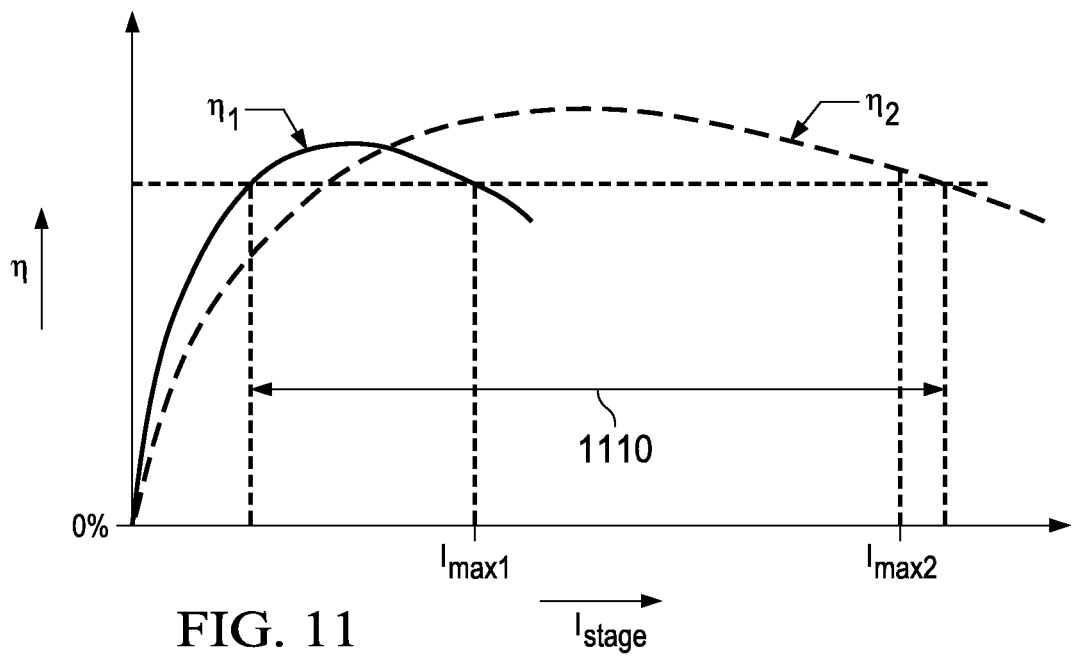
FIG. 11 illustrates a graphical representation demonstrating power converter efficiency of a power converter.

Turning now to FIG. 11, illustrated is a graphical representation demonstrating power converter efficiency of a power converter. The graphical representation illustrates a first power converter efficiency $\eta_1$ for a first converter stage and a second power converter efficiency $\eta_2$ for a second converter stage as a function of converter stage output current $I_{stage}$. The first converter stage and the second converter stage are asymmetrically constructed with unequal output current ratings, as illustrated by the respective maximum current levels $I_{max1}$, $I_{max2}$, respectively. By controlling a current allocation ratio between the two converter stages and at the same time controlling the output voltage Vout, an improved current allocation ratio that provides enhanced power conversion efficiency can be obtained. Such a process allows flexible sizing and control for the individual converter stages so that substantially higher power conversion efficiency can be obtained over a wide high-efficiency operating area, as illustrated by the arrow 1110. Although the graphical representation of FIG. 11 demonstrates asymmetrically sized converter stages, an improvement in a high-efficiency operating area can be obtained for symmetrically sized converter stages as well.

Figure 12:
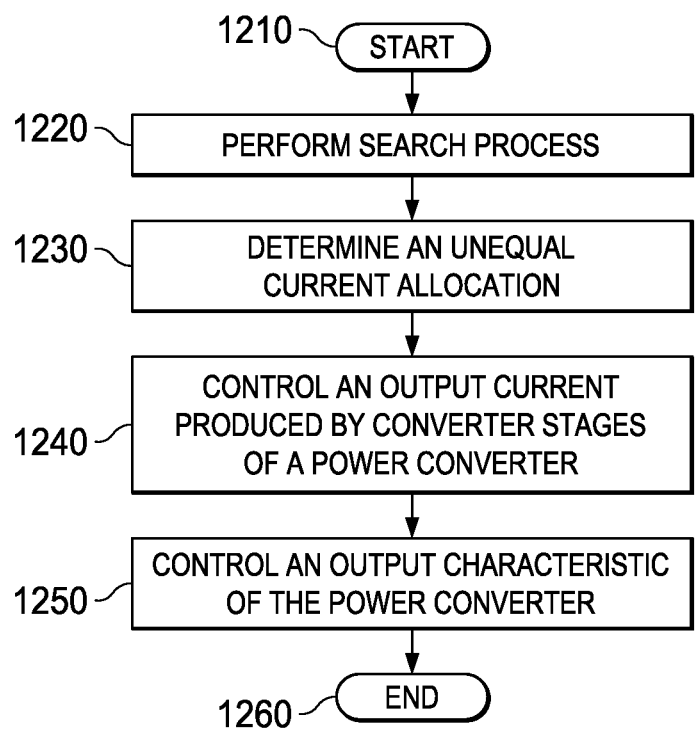
FIG. 12 illustrates a flow diagram of an embodiment of a method of operating a power converter.

Turning now to FIG. 12, illustrated is a flow diagram of an embodiment of a method of operating a power converter including a plurality of converter stages (e.g., coupled in parallel). The method starts at a step or module 1210. At a step or module 1220, the method performs a search process to ascertain an operation of the power converter. The operation of the power converter may include a function proportional to an input current of the power converter. The operation of the power converter may be dependent on an input voltage or an output voltage to the power converter and an output current of each of the plurality of converter stages. The operation of the power converter may include an output current limit for each converter stage of the plurality of converter stages. The plurality of converter stages may be operated with different duty-cycle phase angles. The operation of the power converter may include a sum of terms, ones of which include a ratio of the output current of a converter stage divided by a stage efficiency of the converter stage.

At a step or module 1230, the method determines an unequal current allocation among the plurality of converter stages based on the operation of the power converter. At a step or module 1240, the method controls the output current produced by each of the plurality of converter stages in response to the current allocation. The current allocation may be determined to control an output characteristic (e.g., an output voltage) of the power converter. In accordance therewith, one converter stage of the plurality of converter stages controls an output characteristic of the power converter and remaining converter stages of the plurality of converter stages are controlled with the current allocation to improve the operation of the power converter at a step or module 1250. The plurality of converter stages may include at least one converter stage with a different maximum current rating than another converter stage. The method ends at a step or module 1260.

Thus, a controller for a power converter formed with a plurality of converter stages and methods of operation thereof with readily attainable and quantifiable advantages has been introduced. In an embodiment, the controller includes a power system controller and a converter stage controller. The power system controller is configured to determine an unequal current allocation among the plurality of converter stages based on an operation of the power converter, and the converter stage controller is configured to control an output current produced by each of the plurality of converter stages in response to the current allocation. The operation of the power converter can be, without limitation, a function proportional to an input current of the power converter, or can be represented as a sum of terms, ones of which include a ratio of the output current of a converter stage divided by a stage efficiency of the converter stage.

In an embodiment, the power system controller is configured to determine the current allocation to control an output characteristic of the power converter such as an output voltage. The current allocation can be obtained by employing a search process for the operation of the power converter. The operation of the power converter may be dependent on an input voltage or an output voltage to the power converter and the output current of each of the plurality of converter stages. The operation of the power converter can include an output current limit for each converter stage of the plurality of converter stages.

In an embodiment, one converter stage controller of the plurality of converter stages is controlled to control the output characteristic and remaining converter stages of the plurality of converter stages are controlled with the current allocation to improve the operation of the power converter. The plurality of converter stages can include at least one converter stage with a different maximum current rating than another converter stage to enable higher power conversion efficiency to be obtained for the power converter.

The plurality of converter stages may be coupled in parallel to produce the output current of the power converter. The plurality of converter stages can be operated with different duty-cycle phase angles, for example to reduce output voltage or current ripple. Also, at least one of the power system controller and the converter stage controller may include a field-programmable gate array or other integrated circuit technology.

Those skilled in the art should understand that the previously described embodiments of a controller for a power converter and related methods of operating the same are submitted for illustrative purposes only. In addition, other embodiments capable of producing controllers employable with other power conversion arrangements are well within the broad scope of the present invention. While the controller has been described in the environment of a power converter, the controller may also be applied to other power systems such as, without limitation, a power amplifier, a motor controller, and a power system to control an actuator in accordance with a stepper motor or other electromechanical device.

For a better understanding of integrated circuits, semiconductor devices and methods of manufacture therefor see "Semiconductor Device Fundamentals," by R. F. Pierret, Addison-Wesley (1996), and "Handbook of Sputter Deposition Technology," by K. Wasa and S. Hayakawa, Noyes Publications (1992). For a better understanding of power converters, see "Modern DC-to-DC Switchmode Power Converter Circuits," by Rudolph P. Severns and Gordon Bloom, Van Nostrand Reinhold Company, New York, N.Y. (1985) and "Principles of Power Electronics," by J. G. Kassakian, M. F. Schlecht, and G. C. Verghese, Addison-Wesley (1991). The aforementioned references are incorporated herein by reference in their entirety.

Also, although the present invention and its advantages have been described in detail, it should be understood that various changes, substitutions, and alterations can be made herein without departing from the spirit and scope of the invention as defined by claims on embodiments. For example, many of the processes discussed above can be implemented in different methodologies and replaced by other processes, or a combination thereof.

Moreover, the scope of the present application is not intended to be limited to the particular embodiments of the process, machine, manufacture, composition of matter, means, methods, and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, claims on embodiments are intended to include within their scope such processes, machines, manufacture, compositions of matter, means, methods, or steps.

What is claimed is:

1. A controller for a power converter formed with a plurality of converter stages, comprising:
   a power system controller configured to determine an unequal current allocation among at least two of the plurality of converter stages based on an operation of the power converter; and
   a converter stage controller configured to adjust an output current produced by each of the at least two of the plurality of converter stages based at least in part on the unequal current allocation, wherein the output current produced by the at least two of the of the plurality of converter stages is adjusted to produce the unequal current allocation among the at least two of the plurality of converter stages.

2. The controller of claim 1, wherein the power system controller is configured to determine the unequal current allocation to control an output characteristic of said power converter.

3. The controller of claim 2, wherein the output characteristic is an output voltage.

4. The controller of claim 2, wherein a converter stage controller associated with the plurality of converter stages is configured to control the output characteristic based on the unequal current allocation to improve the operation of the power converter.

5. The controller of claim 1, wherein the unequal current allocation is determined by employing a search process for the operation of the power converter.

6. The controller of claim 1, wherein the plurality of converter stages includes at least one converter stage with a different maximum current rating than another converter stage.

7. The controller of claim 1, wherein the operation of the power converter comprises a function proportional to an input current of the power converter.

8. The controller of claim 1, wherein the operation of the power converter is dependent on an input voltage to the power converter and the output current of each of the at least two of the plurality of converter stages.

9. The controller of claim 1, wherein the operation of the power converter is dependent on an output voltage of the power converter and the output current of each of the at least two of the plurality of converter stages.

10. The controller of claim 1, wherein the operation of the power converter comprises an output current limit for each converter stage of the at least two of the plurality of converter stages.

11. The controller of claim 1, wherein the plurality of converter stages is coupled in parallel to produce a second output current of the power converter.

12. The controller of claim 1, wherein the plurality of converter stages are operated with different duty-cycle phase angles.

13. The controller of claim 1, wherein the operation of the power converter comprises a sum of terms, ones of which comprise a ratio of a first output current of a first converter stage of the plurality of converter stages divided by a stage efficiency of the first converter stage.

14. The controller of claim 1, wherein power system controller or the converter stage controller comprises a field-programmable gate array.

15. A method of operating a power converter formed with a plurality of converter stages, comprising:
    determining an unequal current allocation among at least two of the plurality of converter stages based on an operation of the power converter; and
    adjusting an output current produced by each of the at least two of the plurality of converter stages based at least in part on the unequal current allocation, wherein adjusting the output current produced by the at least two of the of the plurality of converter stages comprising producing the unequal current allocation among the at least two of the plurality of converter stages.

16. The method of claim 15, wherein the unequal current allocation is determined to control an output characteristic of the power converter.

17. The method of claim 15, wherein the operation of the power converter is dependent on an input voltage to the power converter and the output current of each of the at least two of the plurality of converter stages.

18. The method of claim 15, comprising employing a search process for the operation of the power converter to determine the unequal current allocation.

19. The method of claim 15, wherein the plurality of converter stages comprises at least one converter stage with a different maximum current rating than another converter stage.

20. The method of claim 15, wherein a converter stage associated with the plurality of converter stages is configured to control an output characteristic of the power converter based on the unequal current allocation to improve the operation of the power converter.

* * * * *